United States Patent [19]
Bottenbruch et al.

[11] 3,975,225
[45] Aug. 17, 1976

[54] THIN, NON-POROUS POLYCARBONATE FILMS

[75] Inventors: Ludwig Bottenbruch; Günther Kämpf, both of Krefeld-Bockum; Volker Serini; Hugo Vernaleken, both of Krefeld, all of Germany

[73] Assignee: Bayer Aktiengesellschaft, Leverkusen, Germany

[22] Filed: Oct. 1, 1973

[21] Appl. No.: 402,430

[30] Foreign Application Priority Data
Oct. 5, 1972  Germany............................ 2248818

[52] U.S. Cl. ............................ 156/242; 260/47 XA; 264/298
[51] Int. Cl.² ...................... B32B 31/04; B29D 7/06
[58] Field of Search ................ 264/298; 260/47 XA; 156/242

[56] References Cited
UNITED STATES PATENTS

| | | | |
|---|---|---|---|
| 826,781 | 7/1906 | Gregory | 264/298 |
| 2,562,373 | 7/1951 | Arnold | 264/298 X |
| 2,689,187 | 9/1954 | Thomsen | 264/298 X |
| 3,028,365 | 4/1962 | Schnell et al. | 260/47 XA |
| 3,271,364 | 9/1966 | Conix et al. | 260/47 XA |
| 3,445,321 | 5/1969 | Groves | 264/298 X |
| 3,551,244 | 12/1970 | Forester et al. | 264/298 X |
| 3,555,573 | 1/1971 | Turner | 264/298 X |
| 3,679,774 | 7/1972 | Le Grand | 260/47 XA X |
| 3,767,737 | 10/1973 | Lundstrom | 264/298 X |
| 3,833,681 | 9/1974 | Holub et al. | 260/47 XA X |

*Primary Examiner*—Murray Tillman
*Assistant Examiner*—W. C. Danison, Jr.
*Attorney, Agent, or Firm*—Lawrence S. Pope; Gene Harsh

[57] ABSTRACT

Non-porous, thin, polycarbonate films and a process for their production. Solutions of polycarbonates in concentrations of less than 5 parts solids per 100 parts solvent are applied to the surface of liquids immiscible, or sparingly miscible with, the solvent for the polycarbonate. The solvent is then evaporated, and the resultant film removed. The films are useful for the separation of gas and liquid mixtures and for electrical insulating purposes.

10 Claims, No Drawings

THIN, NON-POROUS POLYCARBONATE FILMS

BACKGROUND OF THE INVENTION

Thin, non-porous polymer films are acquiring increasing importance as membranes in permeation installations for the selective separation of certain gases or liquids from gas mixtures or liquid mixtures; in reverse osmosis for desalination of brackish water and seawater; in coatings, for example of metallic workpieces; as electrically insulating films in electrical installations and as dielectrics in condenser construction.

Polycarbonate films possess particular importance in these fields because of their unusual properties. For example, because of their very good electrical insulating capacity and high heat distortion point they are used for insulating purposes in electrical plant construction (electric motors, transformers and others) and because of their very good dielectric properties they are used as dielectrics in condenser construction. Because of their high selective permeability they are also proposed for the separation of helium from natural gas and because of their high permeability for oxygen as against nitrogen they are proposed for the enrichment of oxygen in atmospheric air.

To increase the yield of permeation installations, to reduce the constructional size of electrical machinery and to increase the capacity of condensers, it is desirable to manufacture polycarbonate films which are as thin as possible while at the same time preserving the non-porosity, and to use these films for the abovementioned purpose.

The reason for this is that the gas permeability or liquid permeability increases in inverse proportion to the film thickness, that is to say a reduction of the layer thickness of a film to 1/100 of the original layer thickness produces a 100-fold increase in the permeability of the film. Equally, the capacity of condensers increases in inverse proportion to the layer thickness of the dielectric; a reduction in the layer thickness of a film to 1/100 of its original layer thickness thus leads to a 100-fold increase in the capacity of the condenser.

The lowest thickness of commercially manufactured polycarbonate films is currently 2 $\mu$m = 2 × 10$^{-3}$ mm (sold under the registered trademark MAKROFOL of Bayer AG). Such films are manufactured by casting polycarbonate solutions through slit dies, optionally with subsequent monoaxial, biaxial or surface stretching.

For the abovementioned end uses it is desirable, as indicated above, to manufacture non-porous films based on polycarbonate of which the thickness is approx. one to two powers of ten below the currently achievable minimum thickness of 2 $\mu$m, that is to say between 0.01 and 0.2 $\mu$m. At these extremely low film thicknesses it will in most cases be necessary to use suitable supporting membranes to ensure the requisite mechanical stability and to mount the polycarbonate films, free of tension, on such carriers. Using the abovementioned currently customary manufacturing processes, however, it is not possible to manufacture the requisite extremely thin polycarbonate films so that they are non-porous and to mount them, if desired, free of tension on carriers.

SUMMARY AND DETAILED DESCRIPTION

It has now been found that, surprisingly, non-porous films of thicknesses less than 1 $\mu$m can be manufactured from aromatic polycarbonates if dilute solutions of polycarbonates are applied to the surface of liquids which are immiscible or sparingly miscible with the solvents of the polycarbonates, the polycarbonate solutions are allowed to spread and the solvent is evaporated. The solids concentration of the polycarbonate solutions should be less than or equal to 5 parts per 100 parts of solvent. It is particularly advantageous if the solvent utilized has as low a surface tension relative to the spreading liquid as possible in order to achieve particularly good spreading of the solution and hence the formation of uniform polycarbonate films which are as thin as possible.

It is also advantageous to use solvents of density less than that of water.

Furthermore, it is of particular advantage if the spreading liquid, preferably water, is enriched in, or saturated with, the solvent utilized and/or if the air space above the spreading liquid is enriched in, or saturated with, the vapor of the solvent used.

It is to be understood that the polycarbonate solution may be applied to the surface of the spreading liquid by any suitable means including for example, pouring, dripping or by means of a slit die.

The solvent may be evaporated by any convenient means including for example heating the spreading liquid which as the polycarbonate solution on the surface thereof or by the application of a vacuum.

In a particular embodiment, the polycarbonate solutions can also be applied to the smooth surface of a water-soluble polymer films or to the surface of a solid body which optionally carries a water-soluble intermediate layer and the polymer film formed after spreading of the polymer solution and evaporation of the solvent removed, where necessary, by treatment with water, for example by immersion of the coated polymer film or solid body in water.

If the manufacture of very thin, non-porous films of polycarbonates is to be carried out continuously or discontinuously with large surface dimensions, it is also desirable to apply the polycarbonate solution from a slit die onto the surface of the spreading liquid or onto the surface of the solid body which is to be coated, and in that case the relative-speed between the slit die and the spreading liquid or the solid body to be coated as well as the concentration of the polycarbonate solution must be suitably chosen to obtain non-porous polycarbonate films of the desired thickness.

If the very thin, non-porous polycarbonate film formed is intended to be applied, free of tension, onto a porous, mechanically resistant supporting layer or onto other surfaces of solid bodies, this supporting layer or onto other surfaces of solid bodies, this supporting layer or the solid body to be coated can be introduced into the spreading liquid and a polycarbonate film that is subsequently formed by casting the polymer solution on the liquid surface or a polycarbonate film that has been separately manufactured and applied to the liquid surface, may be applied free of tension onto this supporting layer or onto the solid body by carefully lowering the level of the liquid.

The aromatic polycarbonates suitable for the manufacture of the non-porous films of thicknesses less than 1 $\mu$m generally have molecular weights $\overline{M}_w$ greater than 20,000. They may be manufactured from bisphenols according to known processes. A series of bisphenols which are suitable for the manufacture of such aromatic polycarbonates are contained in the following Patent Specifications: U.S. Pat. No. 3,028,365, 2,999,835, 3,148,172, 3,271,368, 2,991,273, 3,271,367, 3,280,078, 3,014,891, 2,999,846, the disclosures of which are incorporated herein by reference, DOS (German Published Specification) 1,570,703, DOS 2,063,050 and DOS 2,063,052.

Examples of suitable solvents are aliphatic chlorinated hydrocarbons and aromatics, e.g., sym-tetrachloroethane; methylene chloride; cis-1,2-dichloroethylene; 1,2-dichloroethane; styrene and toluene. An example of a particularly suitable polycarbonate solution for the manufacture of non-porous films of thicknesses less than 1 $\mu$m is a solution of polycarbonate from 2,2-bis-(3,5-dimethyl-4-hydroxyphenyl)-propane in styrene.

The polycarbonate from 2,2-bis-(3,5-dimethyl-4-hydroxyphenyl)-propane may be prepared according to the methods described in DOS 2,063,050 and DOS 2,063,052 and U.S. Pat. No. 3,879,348. According to the processes described in these references tetramethyl-substituted bisphenol polycarbonates are prepared by reacting the bischlorocarbonic acid esters of the corresponding bisphenols or by reacting the corresponding bisphenols with phosgene or with the bischlorocarbonic acid esters of the bisphenols in accordance with the phase boundary condensation process, in the presence of aqueous alkali and a solvent suitable for polycarbonates, through the addition of at least 10 mol per cent and up to 200 mol per cent, relative to the bisphenol, of tertiary amine. The subsequent reaction time is chosen so that the product of the amount of amine (mol per cent) and the reaction time (hours) exceeds a value of 15. The process may be carried out in either one step or several steps. For example, the bisphenols are dissolved in aqueous alkali, preferably in sodium hydroxide solution or potassium hydroxide solution, and a suitable solvent for the polycarbonate being produced is added. Suitable solvents of this nature are generally chlorinated hydrocarbons, such as methylene chloride, chloroform and 1,2-dichloroethane, and also chlorinated aromatics, such as chlorobenzene, dichlorobenzene and chlorotoluene. Phosgene is passed into this mixture with vigorous stirring. In the case of bisphenols which, because of their hydrophobic character, do not produce bisphenolate solutions, a suspension is advantageously employed. The amount of phosgene required depends on the bisphenol employed, the stirring action and the reaction temperature, which can lie between about 10° and about 60°C, and is in general 1.1-3.0 mols of phosgene per mol of bisphenol. After the phosgenation, which can also be carried out in the presence of chain stoppers, for example 2,6-dimethylphenol, the condensation to give a high molecular polycarbonate is carried out by adding the tertiary amine, for example trimethylamine, triethylamine, dimethylbenzylamine or triethylenediamine, as the catalyst. The amounts of amine are in general 10-200 mol per cent, relative to bisphenols, but preferably 10-50 mol per cent are employed.

The polycarbonates manufactured in the manner described above may be isolated according to known processes, for example by separating off the aqueous phase, repeatedly washing the organic phase with water until it is free of electrolyte, and thereafter precipitating the polycarbonate or evaporating off the solvent.

The spreading liquid which as stated previously is preferably water is a liquid that is immiscible, or sparingly miscible, with the particular solvent employed in the polycarbonate solution. Suitable spreading liquids may be readily determined by those skilled in the art from any chemical text.

The very thin, non-porous films of polycarbonates, optionally applied to a mechanically resistant, porous supporting layer, are used, inter alia for the separation of gas mixtures and liquid mixtures. This use is made possible by the different permeability, intrinsic to the polycarbonate, towards the various gases, vapors of liquids. Known uses are for the separation of helium from natural gas or for the enrichment of oxygen in atmospheric air because of the approximately 5-fold greater permeability of oxygen as against nitrogen. Since, additionally, polycarbonate has a particularly high permeability for carbon dioxide gas (ratio of the gas permeabilities of $CO_2:O_2:N_2$ = approx. 30:5:1), very thin non-porous polycarbonate films are preferentially suitable for use as a material for oxygen tents in the clinical field, and as breathing masks. Such breathing masks can be used if air of low oxygen content, or heavily polluted air, is to be enriched in oxygen or enriched in oxygen with simultaneous retention of dust-like impurities and almost complete retention of harmful gases and vapors (say car exhaust gases, putrefaction gases and others), by virtue of the intrinsic very low permeability of these gases and vapors through polycarbonate films. As an example, it may be mentioned that the permeabilities of oxygen and propane are in the ratio of approx. 35:1.

A further use of these very thin, non-porous polycarbonate films is for electrical insulating purposes (electrical plant construction, for example high temperature-resistant electrical insulation for electric motors, generators, transformers and others) and for dielectric purposes, for example for electrical condensers. Here it will in most cases be desirable to apply the polycarbonate films directly onto the material to be coated.

The invention may be fully understood by referring to the examples that follow.

EXAMPLE 1

Manufacture of polycarbonate from 2,2-bis-(3,5-dimethyl-4-hydroxyphenyl)-propane and its bischlorocarbonic acid ester.

22.4 g of sodium hydroxide (0.56 mol) and 22.7 g of 2,2-bis-(3,5-dimethyl-4-hydroxyphenyl)-propane (0.08 mol) are dissolved in 600 ml of water. 100 ml of methylene chloride and 3.0 ml of triethylamine (0.02 mol) are then added while stirring. 49.1 g of the bischlorocarbonic acid ester of 2,2-bis-(3,5-dimethyl-4-hydroxyphenyl)-propane (0.12 mol) dissolved in 500 ml of methylene chloride, are added all at once to the mixture, while stirring vigorously. The mixture is then vigorously stirred for a further 2½ hours. The process is carried out under nitrogen at 20°–25°C. After the subsequent stirring the batch is worked up. The aqueous phase is free of bisphenol. The organic phase is diluted with methylene chloride and is then washed twice with 5% strength aqueous hydrochloric acid and thereafter water until free of electrolyte. The polycarbonate is precipitated from the organic phase to yield 59 g of a white flocculent polycarbonate, the methylene chloride solution of which yields a clear, tough, strong film. The relative viscosity of the polymer is 1.529 (in methylene chloride at 25°C, c = 5g/l). The average molecular weight by light-scattering $\overline{M}_w$ is 83,000 and the glass transition temperature is 206°C.

EXAMPLE 2

A 1% strength solution of 2,2-bis-(3,5-dimethyl-4-hydroxyphenyl)-propane-polycarbonate of molecular weight $\overline{M}_w = 37,000$ prepared by methods analogous to Example 1, in styrene, was dripped onto water. After spreading the solution and evaporating the solvent, a uniform, completely non-porous polycarbonate film formed, the thickness of which, estimated from the interference color, was approx. 0.1 $\mu$m. By carefully lowering the water surface, the film was applied, free of tension, onto an electrolytically produced copper grid of mesh width 45 $\mu$m located in the water. The non-porosity of the film was checked under an electron microscope at very high magnification (250,000:1).

EXAMPLE 3

A 1% strength solution of 2,2-bis-(3,5-dimethyl-4-hydroxyphenyl)-propane-polycarbonate of molecular weight $\overline{M}_w$ approx. 100,000, in styrene, was applied to a glass surface rubbed with curd soap; thereafter the glass plate was set up vertically in order to ensure that the solution ran off uniformly and hence a uniform film was formed. After drying, the film was lifted off by immersing the glass plate in water. Here again, the non-porosity was checked under an electron microscope, analogously to Example 2.

While the invention has been described with reference to certain specific embodiments thereof, it is not intended to be limited to these. Accordingly, it is intended to embrace all such alternatives, modifications, and variations as fall within the spirit and scope of the appended claims.

What is claimed is:

1. A process for manufacturing non-porous films having thicknesses less than 1 $\mu$m of polycarbonates from 2,2-bis-(3,5-dimethyl-4-hydroxyphenyl)propane having molecular weights, $M_w$, greater than 20,000, comprising spreading solutions of said polycarbonates in styrene, said solutions having concentrations of at most 5 g of polycarbonate per 100 g of styrene, on a surface that is substantially impregnable to said solvent, evaporating the solvent to form a polycarbonate film and floating said film on the surface of a liquid in which it is substantially insoluble.

2. The process of claim 1, wherein the liquid used for spreading the polycarbonate solution is water.

3. The process of claim 1, wherein the air above the spreading liquid is enriched in or saturated with the vapor of the styrene used for the polycarbonate solution.

4. A polycarbonate film made by the process of claim 1.

5. A process for manufacturing non-porous films having thicknesses less than 1 $\mu$m of polycarbonates from 2,2-bis-(3,5-dimethyl-4-hydroxyphenyl)propane having molecular weights, $\overline{M}_w$, greater than 20,000, comprising spreading solutions of said polycarbonates in styrene, said solutions having concentrations of at most 5 g of polycarbonate per 100 g of styrene, on the surface of liquids that are immiscible, or sparingly miscible, with styrene and in which the polycarbonate is substantially insoluble, and evaporating the styrene whereby the film is formed on the surface of the liquid.

6. The process of claim 5 wherein the liquid employed for spreading the polycarbonate solution is enriched up to the saturation point with the styrene.

7. The process of claim 5 wherein the liquid used for spreading the polycarbonate solution is water.

8. The process of claim 5 wherein the air above the spreading liquid is enriched in or saturated with the vapor of the styrene used for the polycarbonate solution.

9. A polycarbonate film made by the process of claim 5.

10. A process for applying a non-porous film having thickness less than 1 $\mu$m of polycarbonates from 2,2-bis-(3,5-dimethyl-4-hydroxyphenyl) propane having molecular weights, $\overline{M}_w$, greater than 20,000, to the surface of a porous mechanically resistant supporting layer, comprising immersing said supporting layer in a liquid that is immiscible, or sparingly miscible, with styrene spreading a solution of said polycarbonate in styrene, said solution having a concentration of at most 5g of polycarbonate per 100g of styrene, on the surface of said immiscible, or sparingly miscible, liquid; evaporating the solvent wherein the polycarbonate film is formed on the surface of the liquid in which it is substantially insoluble; and thereafter lowering the surface of the liquid below the surface of said supporting layer, whereby the polycarbonate film comes to rest, free of tension on the supporting layer.

* * * * *